(No Model.)

2 Sheets—Sheet 1.

I. E. SMITH.
SLEEPING AND PARLOR CAR COUPON TICKET.

No. 475,424.                                      Patented May 24, 1892.

FORM A 1.
Smith's Coupon Ticket
FOR
DRAWING ROOM AND SLEEPING CARS

_____ a _____    | 100 |
     TO          
CAR_____   A
SEAT_____
UPPER BERTH___
LOWER BERTH___
Room_____

FORM A.1.
Smith's Coupon Ticket
FOR
DRAWING ROOM and SLEEPING CARS
PASSENGERS
Seat or Berth Ticket
This ticket when accompanied by
a first class railroad ticket
entitles the holder to Palace Car
accommodations for one contin-
uous trip for this train and
date only.

_____ a _____   | 100 |
     TO
CAR_____
SEAT_____
UPPER BERTH___
LOWER BERTH___
Room_____

Passengers will surrender
this ticket to the Porter upon
retiring or before leaving
the car. Invalid if Coupon
is detached
                    Gen'l Ticket Ag't Smith's Coupon Ticket
B  b'          | 100 |
     TO
CAR_____
SEAT_____   B
UPPER BERTH___  b
Lower Berth___
Room_____
Coupon not good if detached Smith's Coupon Ticket
C  c'          | 100 |
     TO
CAR_____
SEAT_____   C
UPPER BERTH___  c
LOWER BERTH___
Room_____
Coupon must not be detached except
by Conductor who will when taking up
this ticket cancel same by punch mark in
coupon and head of ticket

FORM A 1.
Smith's Coupon Ticket
FOR
DRAWING ROOM and SLEEPING CARS

Cleveland       | 100 |
  TO
  New York
CAR V. Brandon
SEAT_____
UPPER BERTH___     2.00
LOWER BERTH 11
Room_____
A

FORM A 1.
Smith's Coupon Ticket
FOR
DRAWING ROOM And SLEEPING CARS
PASSENGERS
Seat or Berth Ticket
This ticket when accompanied by
a first class _____ a _____   | 100 |
     TO
CAR_____
SEAT_____

TRANSFER CHECK

TRANSFERED AT___
TO CAR_____
SEAT_____
BERTH UPPER___
BERTH LOWER___
STATE ROOM___

When passengers are transferred the Conductor
will fill out the above designating the space
assigned them, which will entitle the
holder to accommodations for a contin-
uation of the trip for which the ticket was sold.

WITNESSES
Franck L. Ourand
W. E. Schneider

INVENTOR
Isaac E. Smith,
   W. H. Singleton.
       Attorney (No Model.) 2 Sheets—Sheet 2.

I. E. SMITH.
SLEEPING AND PARLOR CAR COUPON TICKET.

No. 475,424. Patented May 24, 1892.

Fig. 6 — Transfer Check

TRANSFER CHECK
TRANSFERED AT Albany
TO CAR Langille
SEAT 5
BERTH UPPER
BERTH LOWER
STATE ROOM When passengers are transferred the Conductor will fill out the above designating the space assigned them which will entitle the holder to accommodations for a continuation of the trip for which the ticket was issued.

Fig. 4

FORM B 1
Smith's Coupon Ticket
FOR
DRAWING ROOM and SLEEPING CARS
PASSENGERS
Seat or Berth Ticket
This ticket when accompanied by a first class railroad ticket entitles the holder to Palace Car accommodations for one continuous trip for this train and date only.

100
_____ TO _____
CAR ____
SEAT ____
UPPER BERTH ____
LOWER BERTH ____
ROOM ____

The conductor in charge of train is required to furnish a ticket to each and every passenger from whom a cash fare is collected, and to D.H. passengers, the ticket to be surrendered to the Porter upon retiring or before leaving the Car. Invalid if coupons are detached.
_____ Gen'l Ticket Ag't Smith's Coupon Ticket
100
_____ TO _____
CAR ____
Seat ____
Upper Berth ____
Lower Berth ____
Room ____
_____ Conductor Smith's Coupon Ticket
100
_____ TO _____
CAR ____
Seat ____
Upper Berth ____
Lower Berth ____
Room ____

Conductors when issuing ticket will cancel amounts showing value of each coupon.

Fig. 5

FORM B 1
Smith's Coupon Ticket
FOR
DRAWING Room and SLEEPING CARS
PASSENGERS
Seat or Berth Ticket
This ticket when accompanied by a first class railroad ticket entitles the holder to Palace Car accommodations for one continuous trip for this train and date only.

100
Cleveland
New York
CAR Brandon
SEAT ____
UPPER BERTH ____
LOWER BERTH 4
ROOM ____

The Conductor in charge of train is required to furnish a ticket to each and every passenger from whom a cash fare is collected, and to D.H. passengers, the ticket to be surrendered to the Porter upon retiring or before leaving the Car. Invalid if coupons are detached.
J. Doe ____ Gen'l Ticket Ag't WITNESSES
R. O. Howell
H. Van Steenbergh INVENTOR
Isaac E. Smith
per M. H. Singleton
Attorney

UNITED STATES PATENT OFFICE.

ISAAC E. SMITH, OF ST. JOHNSVILLE, NEW YORK.

SLEEPING AND PARLOR CAR COUPON-TICKET.

SPECIFICATION forming part of Letters Patent No. 475,424, dated May 24, 1892.

Application filed February 4, 1892. Serial No. 420,359. (No model.)

*To all whom it may concern:*

Be it known that I, ISAAC E. SMITH, a citizen of the United States, residing at St. Johnsville, in the county of Montgomery and State of New York, have invented certain new and useful Improvements in Tickets to be Used in the Sleeping-Car and Parlor-Car Service upon Railroads; and I do hereby declare the following to be a full, clear, and exact description of the invention, such as will enable others skilled in the art to which it appertains to make and use the same.

This invention relates to an improved ticket to be used in the sleeping-car and parlor-car service upon railroads.

There are now in general use two systems under which the agent at a station gives the passenger a ticket which the latter surrenders to the sleeping-car or parlor-car conductor, securing therefor a slip properly punched. This slip under one system he surrenders to the porter, under another he retains, the conductor keeping a duplicate. The present invention presents these advantages over the old systems. There is no duplication of work, and consequently it materially lessens the clerical work on the train. The passenger being allowed to hold his original ticket to the end of his journey is spared the annoyance of exchanging tickets for checks, and it will completely avoid all chances of controversy over an error in marking tickets or duplicate sale of same. With this system passengers can be ticketed to their destination over two or more lines without further expense or annoyance than the changing from one line to another. The passengers being permitted to hold their original ticket, showing from where and to where they are ticketed and to what accommodations they are entitled, being printed with a transfer-blank on the reverse side, it will be treated by the conductor the same as transfer-checks now in use are, except with less annoyance to passengers and in much less time. Besides with this system each car will be credited with the amount earned.

In the annexed drawings, Sheet I shows one form of the invention to be used at a station, and Sheet II another form to be used by the sleeping-car or parlor-car conductor on the train.

On the sheets, Figure 1 shows a form of ticket to be issued at a station. Fig. 2 shows such ticket partially filled. Fig. 3 shows the back with the transfer-check. Figs. 4, 5, and 6 show similar views of the form of ticket issued by the conductor on a car.

This ticket consists of a main portion A, and as many coupons B C, &c., as there are changes along the route to destination, each coupon representing a car to be ridden in. The main portion and each coupon have upon them the instructions how they are to be used. Upon the main portion and each coupon are spaces $a$, $b$, and $c$ for filling the two termini of the ticket and each coupon. Each coupon also has spaces for filling in the two termini for the use of that coupon, as at $b'$ $c'$. The main portion and each coupon contain a space for filling in the full piece of the ticket, and also the name of the car and the space to be occupied by the passenger. On the back of the ticket is a transfer, such as shown in Fig. 3.

The form of ticket shown in Sheet II is substantially the same as that shown in Sheet I. It varies only in having the instructions different, so as to suit the duties of a conductor, and is provided with date and value marks, as the conductor has to give the ticket for any desired distance and each ticket must be prepared so as to suit the wants of any passenger going between any two stations.

When a passenger purchases such a ticket for a through trip the agent or conductor fills in the main portion with the names of the termini of the trip, the price of the ticket, the name of the first car, and the space to be occupied. Each coupon is filled out in the same way, and in addition thereto the termini of this coupon is placed thereon. On the first car the conductor lifts the coupon C, on the next car the coupon B, and on the last car the main portion A is turned in. On changing from one car to the next the conductor of the last car fills in the transfer-check on the back.

Having thus described my invention, what I claim is—

A ticket for use in sleeping-car and parlor-car service for a continuous trip in several cars, which consists in a slip having a main portion and coupons, one for each car to be occupied, the main portion and each coupon containing spaces for the names of the termini of the entire ticket and for the price therefor and for the designation of the car and space therein to be occupied, and the coupons also containing spaces for the names of the termini of the coupons, and said slip having a transfer-check on the back, as set forth.

In testimony whereof I affix my signature in presence of two witnesses.

ISAAC E. SMITH.

Witnesses:
 W. H. VAN STEMBERGH,
 R. O. HOWELL.